US012591211B2

(12) United States Patent
Nasir

(10) Patent No.: US 12,591,211 B2
(45) Date of Patent: Mar. 31, 2026

(54) TUNING OF CONTROL PARAMETERS FOR SIMULATION SYSTEMS AND APPLICATIONS

(71) Applicant: NVIDIA Corporation, Santa Clara, CA (US)

(72) Inventor: Mohammed Nasir, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 806 days.

(21) Appl. No.: 17/933,911

(22) Filed: Sep. 21, 2022

(65) Prior Publication Data

US 2024/0094685 A1     Mar. 21, 2024

(51) Int. Cl.
G05B 13/04 (2006.01)
(52) U.S. Cl.
CPC ......... G05B 13/041 (2013.01); G05B 13/042 (2013.01)
(58) Field of Classification Search
None
See application file for complete search history.

(56) References Cited

U.S. PATENT DOCUMENTS

| | | | | |
|---|---|---|---|---|
| 11,673,584 B2 * | 6/2023 | Wang | ................. | B60W 60/001 |
| | | | | 701/25 |
| 2002/0016640 A1 * | 2/2002 | Gagne | ................. | G05B 13/042 |
| | | | | 700/29 |
| 2006/0284588 A1 * | 12/2006 | Vau | ....................... | G05B 19/19 |
| | | | | 318/677 |
| 2008/0229754 A1 * | 9/2008 | Goebel | .................... | F02C 9/00 |
| | | | | 60/772 |
| 2009/0089031 A1 * | 4/2009 | Sturrock | ............... | G05B 17/02 |
| | | | | 703/7 |
| 2012/0095734 A1 * | 4/2012 | Moll | ...................... | G06F 17/11 |
| | | | | 703/2 |
| 2015/0268645 A1 * | 9/2015 | Shi | ........................ | G05B 13/04 |
| | | | | 700/31 |
| 2016/0357162 A1 * | 12/2016 | He | .......................... | G06F 17/10 |
| 2018/0107173 A1 * | 4/2018 | Tian | .................... | G05B 13/024 |

(Continued)

OTHER PUBLICATIONS

A.E. Eiben, S.K. Smit, "Parameter tuning for configuring and analyzing evolutionary algorithms", Swarm and Evolutionary Computation, vol. 1, Issue 1, 2011, pp. 19-31, ISSN 2210-6502, https://doi.org/10.1016/j.swevo.2011.02.001. (Year: 2011).*

*Primary Examiner* — Ariel Mercado-Vargas
(74) *Attorney, Agent, or Firm* — Sanders IP Law

(57) ABSTRACT

Embodiments of the present disclosure relate to a method of automated tuning of control parameters. In some implementations, the method may include obtaining, from a search algorithm, one or more parameter sets that determine how a controller responds to an environment with at least one changing variable. In these and other implementations, at least one of the parameter sets may include a vector parameter that includes a vector of values. In these and other implementations, a value selected from the vector of values for the vector parameter during operation of the controller may be based on the at least one changing variable. In some implementations, the method may include ordering the vector of values for the vector parameter of the parameter sets and simulating at least one operation of the controller using the parameter sets with the ordered vector of values for the vector parameter.

18 Claims, 10 Drawing Sheets

(56) References Cited

U.S. PATENT DOCUMENTS

| | | | | |
|---|---|---|---|---|
| 2020/0167691 A1* | 5/2020 | Golovin | .................. | G06N 7/01 |
| 2021/0323578 A1* | 10/2021 | Wang | ..................... | G06F 17/18 |
| 2022/0097728 A1* | 3/2022 | Lin | ....................... | G06N 20/00 |
| 2022/0100155 A1* | 3/2022 | Vilinski | .............. | G05B 13/029 |

* cited by examiner

100

Control System
110

Control Parameters
112

Simulation System
120

Performance Data
124

Ordered Control Parameter Sets
122

Search System
130

Search Algorithm
132

Control Parameter Sets
134

Candidate Control Parameter Sets
136

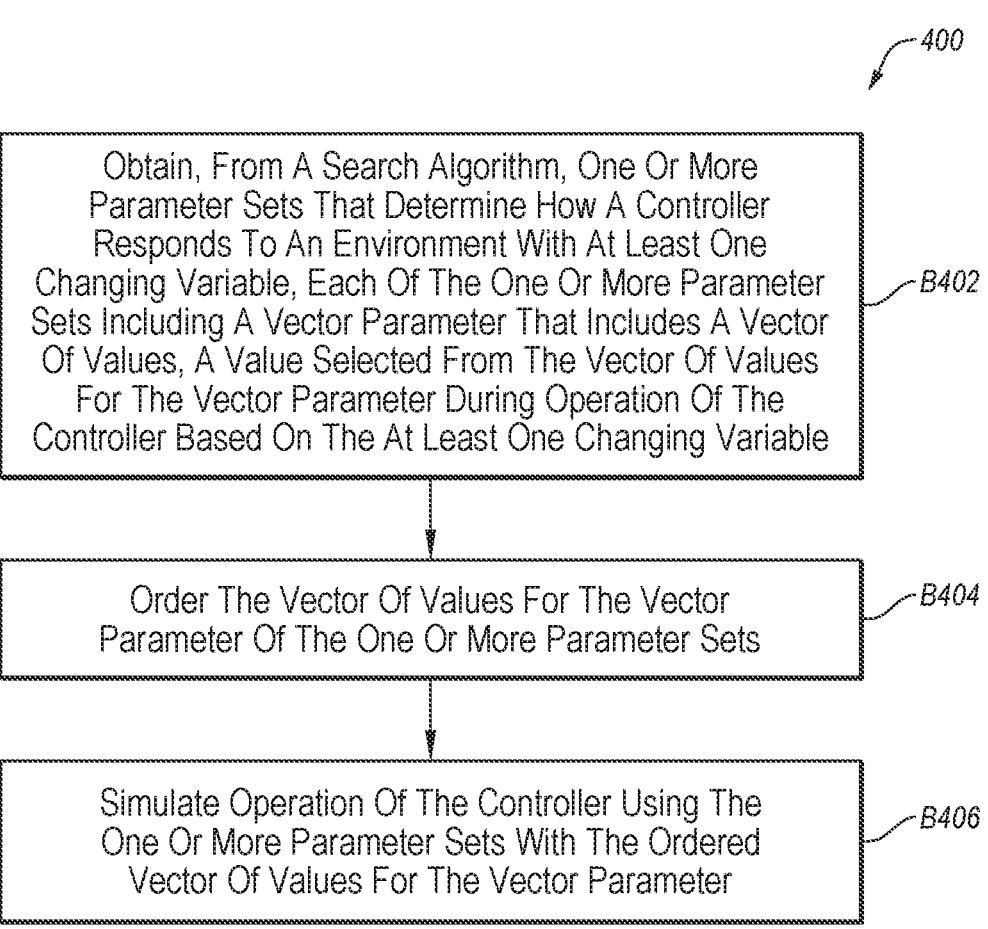

_400_

Obtain, From A Search Algorithm, One Or More Parameter Sets That Determine How A Controller Responds To An Environment With At Least One Changing Variable, Each Of The One Or More Parameter Sets Including A Vector Parameter That Includes A Vector Of Values, A Value Selected From The Vector Of Values For The Vector Parameter During Operation Of The Controller Based On The At Least One Changing Variable

_B402_

Order The Vector Of Values For The Vector Parameter Of The One Or More Parameter Sets

_B404_

Simulate Operation Of The Controller Using The One Or More Parameter Sets With The Ordered Vector Of Values For The Vector Parameter

Stereo Camera 568

Mid-Range Camera, Wing Mirror Mount 598

Surround Camera(s) 574

Infrared Camera 572

Long-Range Camera 598

Surround Camera(s) 574

Mid-Range Camera, Wing Mirror Mount 598

Surround Camera 574

Wide View Camera 570

Long-Range Camera 598

Stereo Camera 568

500

700

TUNING OF CONTROL PARAMETERS FOR SIMULATION SYSTEMS AND APPLICATIONS

BACKGROUND

Actions of system controllers may be based on control parameters used by the system controllers. The control parameters may be tuned to cause the system controllers to generate a particular response. Control parameters may be tuned manually. In these circumstances, the initial values for the set of parameters may be calculated and then manually adjusted through trial-and-error. Alternately or additionally, control parameters may be tuned using an exhaustive search algorithm or a gradient descent algorithm. Exhaustive search algorithms may perform well for controllers with few parameters, but for controls with larger number of parameters, an exhaustive search may become infeasible given the number of possible combinations of parameters. Gradient descent algorithms may include multiple locally optimal points at which the gradient descent algorithm may converge. As a result, gradient descent algorithms may become fixed at a locally optimal point and never perform a thorough search of the entire search space to locate a more global optimal point.

SUMMARY

Implementations of the present disclosure relate to automated tuning of control parameters of controllers, such as control systems. Control parameters may have a value that may determine how a controller responds to inputs. Tuning of control parameters may include selection of values for the control parameters to improve or optimize a response of a controller to inputs. One or more implementations may be implemented as a method to automate tuning of control parameters for a controller that includes multiple control parameters. The method may include obtaining, from a search algorithm, one or more potential sets of control parameters for the controller. In one or more implementations, at least one of the one or more parameter sets may include a vector parameter that includes a vector of values and a value selected from the vector of values for the vector parameter during operation of the controller may be based on a at least one changing variable provided as an input to the controller. One or more implementations of the method may also include ordering the vector of values for the vector parameter of the one or more parameter sets. One or more implementations of the method may also include simulating at least one operation of the controller using the one or more parameter sets with the ordered vector of values for the vector parameter. Based on the simulation, one of the potential sets of control parameters for the controller may be selected for use in the controller.

BRIEF DESCRIPTION OF THE DRAWINGS

The present systems and methods for yield scenario encoding for autonomous systems are described in detail below with reference to the attached drawing, wherein:

FIG. 3A illustrates an example unordered vector parameter, in accordance with some embodiments of the present disclosure;

FIG. 3B illustrates an example ordered vector parameter, in accordance with some embodiments of the present disclosure;

FIG. 4 is a flow diagram showing another method of automated tuning of control parameters, in accordance with some embodiments of the present disclosure;

DETAILED DESCRIPTION

Figure 1:
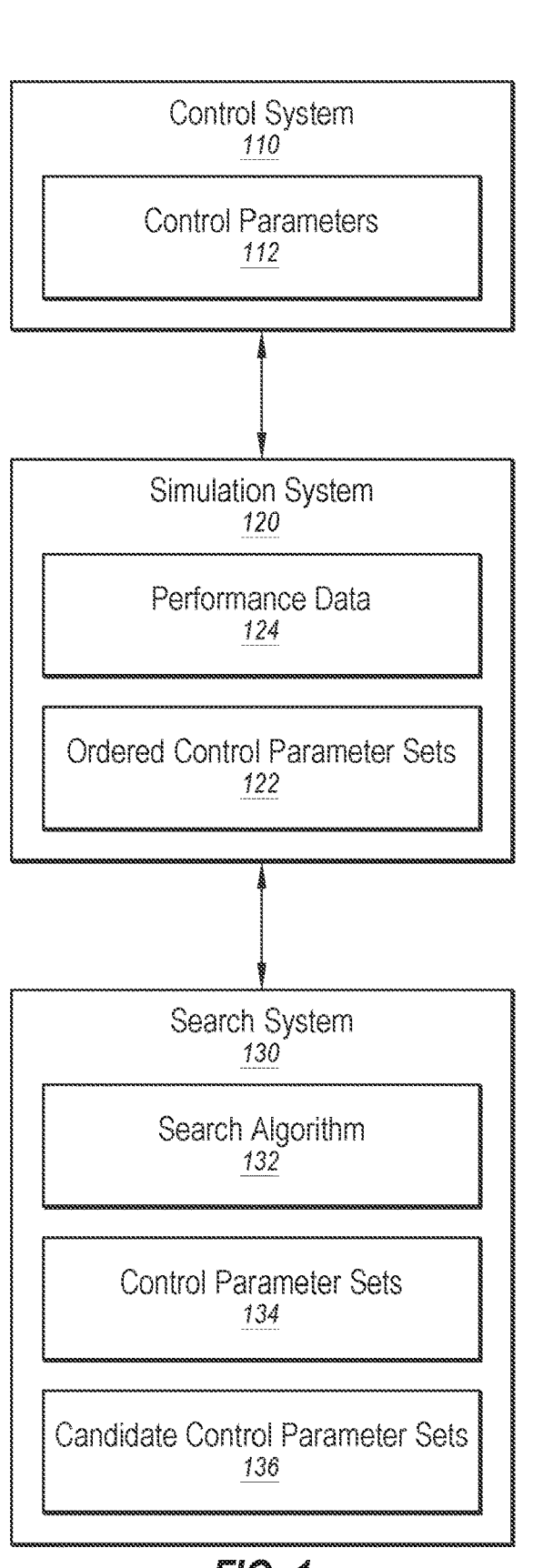
FIG. 1 illustrates an example environment for automated tuning of control parameters, in accordance with some embodiments of the present disclosure.

Control systems may be used in many different industries to manage, direct, and/or regulate behavior of devices and/or other systems. For example, a control system may regulate behavior of semi-automated or an automated process performed by the device and/or other systems in industrial processes including oil and gas extraction, mining, chemical processes, manufacturing of materials, manufacturing of chemical compounds, manufacturing of products, such as semiconductors, vehicles, electronics, building products, and household products, among other products. As other examples, a control system may be used in non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other robot, machine, or vehicle types. Further, a control system may be used in machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable application in which a control system may be implemented.

In some circumstances, control systems may be closed-loop control systems and include feedback systems. A feedback system may provide feedback information regarding the state of a variable in a process being controlled by a control system. The control system may respond to the feedback information by directing a change in a process controlled by the control system. The response of the control system, for example how much of a change or a type of change implemented by a control system, to feedback information may be based on values of control parameters included in the control system.

For example, a control system may include a mathematical algorithm that may assist in determining how the control system responds to feedback information and other information. In this example, the control parameters may be variables in the mathematical algorithm with values that may be selected from a range of values. As an example, a control system may have a control parameter P1. During an implementation of the control system, the control parameter P1 may have a set value. However, the value for the control parameter P1 may be selected from a range of value for any given implementation of the control system. Changes to the value of the control parameter P1 may determine how the control system responds to inputs to the control system. For example, the control system may be implemented in a cruise control system of a vehicle. The control parameter P1 may affect a rate of acceleration of the vehicle when the vehicle accelerates to maintain a selected speed. Thus, a first value for the control parameter P1 may cause the vehicle to accelerate more quickly than a second value for the control parameter P1. Alternately or additionally, some control systems may include vector control parameters. Instead of a single value which a control system may use to determine a response in an implementation of the control system, a vector control parameter may include a vector of values from which a single value is selected based on a value of a variable of a system being controlled. As the value of the variable changes, the value selected from the vector of values may change as well. Thus, a value of a vector control parameter used by an implementation of a control system may vary during operation of the control system. In some circumstances, the vector control parameter may be a continuous state control parameter. As a result, the values in the vector control parameter may be ordered to be monotonically increasing or decreasing to allow a control system that includes the vector control parameter to operate correctly.

In some circumstances, values of control parameters may be selected to improve or optimize responses of a control system. Selection of values for control parameters may be difficult in some situations given a design of a control system. For example, some control systems may include many control parameters, such that an exhaustive search algorithm to select values for the control parameters may not be feasible.

According to one or more embodiments of the present disclosure, methods and systems are disclosed that automate tuning or selection of control parameters. Automated tuning of control parameters may include using search algorithms to select values of control parameters for a control system to improve or optimize responses of the control system. To allow a search algorithm to select control parameters that improve responses of the control system, the control system may be simulated to obtain a response of the control system. However, some search algorithms may not generate results for a vector of values that are monotonically increasing or decreasing. As such, the vector control parameters generated by a search algorithm may be ordered before simulation and being implemented in a control system. By ordering the values in the vector control parameters before simulation, additional types of search algorithms may be used to select control parameters for control systems that include vector control parameters.

In some embodiments, a method to automate tuning of control parameters may include obtaining one or more first control parameter sets of a control system. Each of the first control parameter sets may include a vector parameter. A simulation of operation of the control system using one or more of the control parameter sets may be performed and an indication of controller functionality for one or more of the control parameter sets may be obtained. Using the indications of controller functionality, a search algorithm may determine one or more second control parameter sets. The vector parameters of the second control parameter sets may be ordered and simulation of operation of the control system using one or more of the second control parameter sets may be performed. This process may be iteratively performed to determine a control parameter set that may perform at a particular level, e.g. an optimized level.

With reference to FIG. 1, FIG. 1 illustrates an example environment 100 for automated tuning of control parameters, in accordance with some embodiments of the present disclosure. The environment 100 may include a control system 110, a simulation system 120, and a search system 130. In some embodiments, the control system 110 may include control parameters 112. In some embodiments, the simulation system 120 may include ordered control parameters sets 122 and performance data 124. In some embodiments, the search system 130 may include a search algorithm 132, control parameter sets 134, and candidate control parameter sets 136.

Each of the control system 110, the simulation system 120, and the search system 130 may include code and routines configured to enable a computing system to perform one or more operations. Additionally or alternatively, each of the control system 110, the simulation system 120, and the search system 130 may be implemented using hardware including a processor, a microprocessor (e.g., to perform or control performance of one or more operations), a hardware accelerator, a field-programmable gate array (FPGA), or an application-specific integrated circuit (ASIC). In some other instances, each of the control system 110, the simulation system 120, and the search system 130 may be implemented using a combination of hardware and software. In the present disclosure, operations described as being performed by one of the control system 110, the simulation system 120, and the search system 130 may include operations that the control system 110, the simulation system 120, and the search system 130 may direct a corresponding system to perform.

In some embodiments, the control system 110 may be configured to control, e.g., manage, direct, and/or regulate, behavior of a device/system. For example, the control system 110 may be configured to control behavior of a process performed by a device based on an environment in which a device operates. For example, the control system 110 may be configured to adjust one or more parameters of a system to reduce a difference between a measured value of a system and a desired value of the system. Alternately or additionally, the control system 110 may be configured to control behavior of a device to perform an automated or semi-automated process. For example, the automated process may relate to control of a device, such as an ego-machine, to perform one or more functions. In these and other embodiments, the one or more functions may include multiple sub-functions to perform the function. For example, the function may be autonomous driving of a vehicle along a city street at night. The function of automated driving along a city street at night may include multiple sub-functions, controlling speed, controlling direction, avoiding obstacles, such as pedestrians, stopping at stop lights, navigating turns, etc. This example is of an automated process is a complex automated process. However, the systems/methods described in this disclosure are applicable to control systems for simpler processes as well. For example, a control system that is used to only control speed of a vehicle.

In some embodiments, the control system 110 may obtain input and may manage, direct, and/or regulate, behavior of a device/system based on the input. For example, the input may include conditions of an environment in which the device/system operates, a condition of the device/system, and/or a direction with respect to a process that the device/ system may perform. In response to the inputs, the control system 110 may adjust one or more conditions, parameters, outputs, and/or behaviors of the device/system. For example, an input for a control system of an autonomous vehicle may include sensor data regarding an object near the autonomous vehicle. The control system of the autonomous vehicle may determine a reaction of the autonomous vehicle to the object. The reaction may include changing speed, changing direction, sounding a horn, etc. In some embodiments, the control system 110 may be integrated into the device/system or separate from the device/system that the control system 110 controls.

In some embodiments, the control system 110 may be configured to control behavior of a device/system in any number of fields. For example, the control system 110 may be configured to control automated or semiautomated processes and/or behaviors of a device/system in industrial processes including oil and gas extraction, mining, chemical processes, manufacturing of materials, manufacturing of chemical compounds, manufacturing of products, such as semiconductors, vehicles, electronics, building products, and household products, among other products. For example, the control system 110 may control robots that may assist in these industrial processes. For example, the control system 110 may control robots that may assist in development and movement of wafers in manufacturing of semiconductors. Alternately or additionally, the control system 110 may control chemical mixtures and processes for manufacturing chemicals. Alternately or additionally, the control system 110 may control robotic arms that may assist in manufacturing of vehicles.

Alternately or additionally, a control system may regulate behavior of an automated process in any system. For example, a control system may be used for automated processes to control of any type of machine, such as an autonomous vehicle, an example of which is described with respect to FIGS. 5A-5D. For example, a control system may take as inputs information from any of the sensors, such as GNSS sensors 558, radar sensors 560, Ultrasonic sensors 562, LIDAR sensors 564, or IMU sensors 566 described in FIGS. 5A and/or 5C or the cameras, such as stereo cameras 568, wide view cameras 570, infrared cameras 572, surround cameras 574, or long range cameras 598, described in FIGS. 5A, 5B, and/or 5C. The control system may be implemented in the system 576 of FIG. 5D and may autonomous or semi-autonomous control the systems of FIG. 5C, such as the propulsion system 550 and/or steering system 554, based on the inputs.

Alternately or additionally, the control system may be used in non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other robot, machine, or vehicle types. Further, a control system may be used in machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications in which a control system may be implemented.

In some embodiments, the control system 110 may be configured to control a behavior of a device/system based on the control parameters 112. A number of the control parameters 112 may vary based on the device/system being controlled. For example, the number of the control parameters 112 may range between one and thousands. For example, simpler control systems may include fewer control parameters, and more complex control systems may include more control parameters.

In these and other embodiments, the control parameters 112 may each include one or more values that may be used by logic of the control system 110. The logic of the control system 110 and the values may determine how the control system 110 controls the behavior of a device/system. For example, the logic of the control system may be represented by one or more mathematical equations. An output of the mathematical equation in response to an input may determine how the control system 110 controls the device/system. The control parameters 112 may represent variables in the mathematical equations. As such, the values of the control parameters 112 may affect how the control system 110 controls the behavior of a device/system.

For example, the control system 110 may determine how a device/system responds to an environment. As an example, a control system 110 for a robot may determine how quickly the robot turns in response to encountering a turn along a path of the robot. A control parameter of the control system 110 with a first value may result in the control system 110 directing the robot to turn quickly. In contrast, the control parameter with a second value may result in the control system 110 directing the robot to turn slowly.

In some embodiments, one or more of the control parameters 112 may be vector control parameters. A vector control parameter may not include a single value but a vector of values. In these and other embodiments, a value of a vector control parameter may be selected from among the values of the vector of values. A value from a vector of values may be selected based on a condition of a device/system the control system 110 is controlling and/or a condition of an environment in which the device/system is located that the control system 110 is controlling. Note that the value of the vector control parameter may change during operation of the control system 110 based on a change to a condition upon which the value is based. Thus, the value of the vector control parameter may change as the condition on which the value is based changes.

For example, a vector control parameter may include three values, V1, V2, and V3. A condition upon which the vector control parameter may be based may be a temperature of a device/system. For a first range of temperatures, a value of the vector control parameter may be V1. For a second range of temperatures, a value of the vector control parameter may be V2 and for a third range of temperatures, a value of the vector control parameter may be V3. The temperature of the device/system may change during operation of the device/system. As a result, the value of the vector control parameter may change as the control system 110 controls the device/system.

As another example, a vector control parameter may include three values, V1, V2, and V3. A condition upon which the vector control parameter may be based may be a speed of a vehicle. For a first range of speeds, a value of the vector control parameter may be V1. For a second range of speeds, a value of the vector control parameter may be V2 and for a third range of speeds, a value of the vector control parameter may be V3. The speeds of the vehicle may change during operation of the vehicle. As a result, the value of the vector control parameter may change as the control system 110 controls the vehicle. As an example, the vector control parameter may affect a sensitivity level of steering of the vehicle.

In some embodiments, the simulation system 120 may be configured to perform simulations of the control system 110. In these and other embodiments, performance of simulations of the control system 110 may include simulation of operation of a device/system that the control system 110 is configured to control. Alternately or additionally, performance of simulations of the control system 110 may include simulation of an environment in which the device/system that the control system 110 is configured to control. For example, the simulation system 120 may be configured to provide inputs to the control system 110 that represent an environment and/or state/condition of the device/system. In response to the inputs, the control system 110 may adjust one or more conditions, parameters, outputs, and/or behaviors of the device/system. The simulation system 120 may use the adjustments and provide further inputs to the control system 110 based on the adjustments. Thus, the simulation system 120 may simulate behavior of a device/system that the control system 110 may be configured to control or an environment in which the device/system operates. For example, for a control system of an autonomous vehicle, such as the autonomous vehicle illustrated in FIGS. 5A-5D, the simulation system 120 may simulate inputs for sensors and/or cameras of the autonomous vehicle and provide the simulated inputs to the control system.

In some embodiments, the simulation system 120 may measure performance of the control system 110 during the simulation of the simulation system 120 with respect to one or more performance indicators. The performance indicators may be selected based on a particular operation of the device/system. The simulation system 120 may record the measured performance of the control system 110 as the performance data 124. For example, referring back to the previous example, the simulation system 120 may measure how the control system controls the propulsion system and/or steering system of the autonomous vehicle. For example, the simulation system 120 may measure how smoothly the control system would cause a vehicle to perform a turn.

In some embodiments, the simulation system 120 may be configured to perform simulations for each of multiple different sets of the control parameters 112 of the control system 110. For example, the simulation system 120 may include multiple ordered control parameter sets 122. An ordered control parameter set 122 may include the control parameters that may be used by the control system 110. For example, the control system 110 may include three control parameters, P1, P2, and P3. Each of the control parameters sets 122 may include the three control parameters, P1, P2, and P3. The values of the three control parameters, P1, P2, and P3 in one or more of the sets may be different. For example, in a first control parameter set, P1 may have a value of V1, P2 may have a value of V2, and P3 may have a value of V3. In a second control parameter set, P1 may have a value of V3, P2 may have a value of V2, and P3 may have a value of V5. In these and other embodiments, the control parameter sets 122 may include vector control parameters. The vector control parameters in the control parameter sets 122 may be ordered. As such, the control parameter sets 122 may be ordered control parameter sets 122.

In these and other embodiments, the simulation system 120 may perform one or more simulations of the control system 110 for each of the ordered control parameter sets 122. For simulations performed with any of the ordered control parameters sets 122, the simulation system 120 may record performance data 124.

For example, when the ordered control parameters sets 122 include two control parameters sets, e.g., a first and second ordered control parameter sets, the simulation system 120 may perform one or more simulations of the control system 110 with the first ordered control parameter set and may perform one or more simulations of the control system 110 with the second ordered control parameter set. In these and other embodiments, the simulation system 120 may record first performance data for the one or more simulations performed with the first ordered control parameter set and may record second performance data for the one or more simulations performed with the second ordered control parameter set. In these and other embodiments, the simulation system 120 may perform two or more simulations for each of the ordered control parameters sets 122. In these and other embodiments, the simulation system 120 may mathematically combine the performance data from each of the simulations for each of the sets. For example, the simulation system 120 may perform three simulations for a first ordered control parameter set and mathematically combine the performance data for the three simulations performed with first ordered control parameter set. The simulation system 120 may also perform three simulations for a second ordered control parameter set and mathematically combine the performance data for the three simulations performed with the second ordered control parameter set.

In these and other embodiments, the simulation system 120 may mathematically combine the performance data by determining a mean, medium, weighted mean, or some other mathematical combination of the performance data.

Figures 3A, 3B:
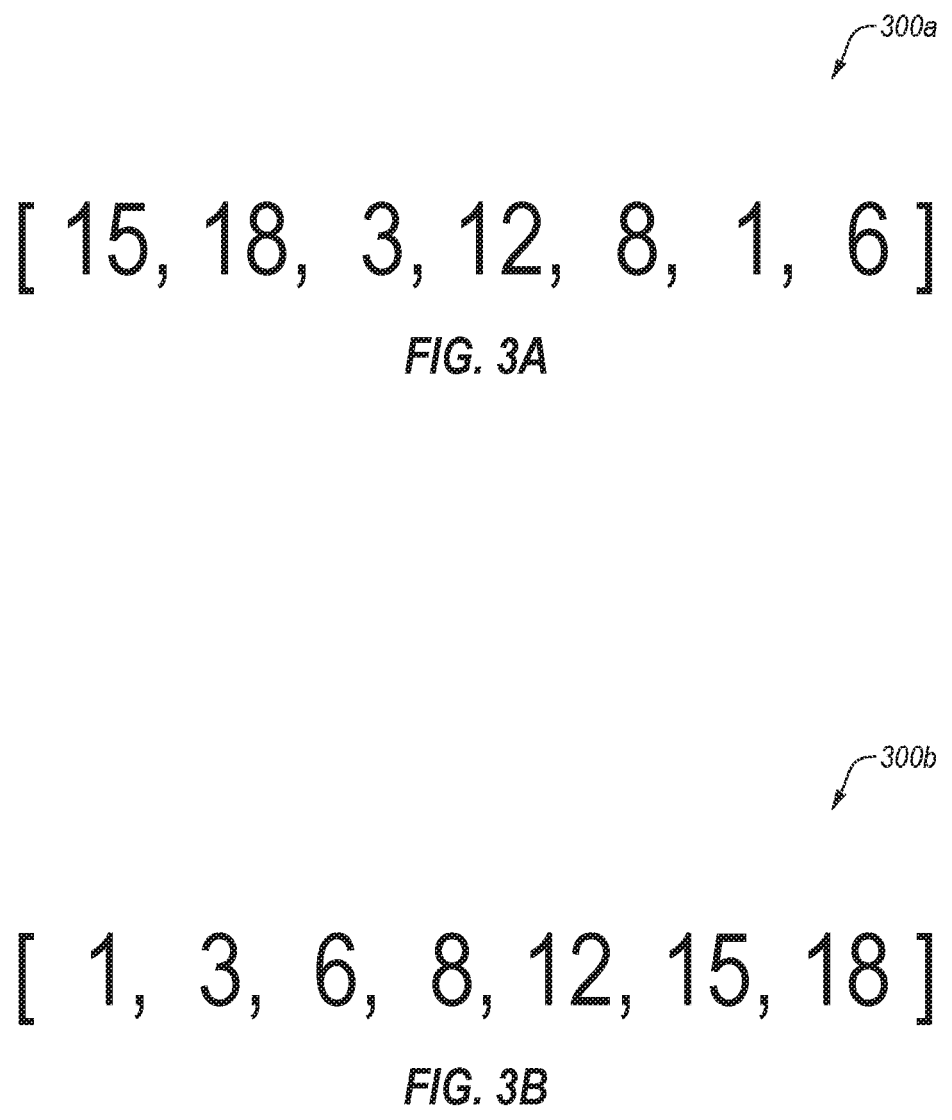

In some embodiments, the simulation system 120 may obtain the control parameters sets from the search system 130. In these and other embodiments, one or more of the vector control parameters in the control parameters sets obtained from the search system 130 may be unordered. For example, the values of the vector control parameters may be unordered such that the values are not monotonically increasing or monotonically decreasing. FIG. 3A illustrates an example unordered vector parameter 300a, in accordance with some embodiments of the present disclosure. As illustrated, the unordered vector parameter 300a may include seven values. Note that the values do not increase or decrease as the values appear in the vector. Rather, the values may be randomly located within the vector such that when moving from left to right among all of the values of the vector that the values do not monotonically increase or decrease.

Returning to the discussion of FIG. 1, in some embodiments, some vector control parameters, such as vector control parameters that correspond to continuous state spaces, may cause a control system to operate incorrectly when the values are not monotonically increasing or monotonically decreasing. In these and other embodiments, the simulation system 120 may be configured to order the vector control parameters of each of the control parameter sets obtained from the search system 130 for which ordering is applicable. Ordering the vector control parameters may include rearranging the values of the vector control parameters to be monotonically increasing or monotonically decreasing. FIG. 3B illustrates an example ordered vector parameter 300*b*, in accordance with some embodiments of the present disclosure. The ordered vector parameter 300*b* may include the same values as the unordered vector parameter 300*a*. However, the values increase as the values appear in the vector when moving from left to right. Thus, ordering the unordered vector parameter 300*a* may result in the rearranging of the locations of the values in the unordered vector parameter 300*a* to produce the ordered vector parameter 300*b* without changing the values of the unordered vector parameter 300*a*.

Returning to the discussion of FIG. 1, in some embodiments, the simulation system 120 may order the vector control parameters of the control parameter sets before simulating the control system 110. In these and other embodiments, the simulation system 120 may order vector control parameters to be either monotonically increasing or monotonically decreasing based on order variable provided by the search system 130. For example, each of the control parameters sets may be associated with an order variable for each of the vector control parameters to be ordered. For example, a control parameter set with three vector control parameters may be associated with three order variables, one order variable for each of the vector control parameters. In these and other embodiments, the order variable may indicate if values of the vector control parameters are to be monotonically increasing or monotonically decreasing. In these and other embodiments, the simulation system 120 may order a vector control parameter based on a value of the order variable corresponding to the vector control parameter. Note that the simulation system 120 may not change the values of the vector control parameters. Rather, the simulation system 120 may only order, e.g., rearrange, the order of the values in the vector control parameters to be monotonically increasing or monotonically decreasing. Furthermore, the order variable may not be used by the control system 110. Rather, the order variable may be generated by the search algorithm 130 and only be used by the simulation system 120 to order the control parameters sets that are used by the control system 110. As such, the order variable may be limited to the tuning of the control parameters performed by the environment 100 and not implemented in the control system 110 in an operational device/system.

Thus, the simulation system 120 may perform one or more simulations of the control system 110 for each of the ordered control parameters sets 122 and record performance data 124 for each of the simulations. As such, the performance data 124 may correspond to the ordered control parameters sets 122. The simulation system 120 may provide the performance data 124 to the search system 130 and indicate the correspondence between the performance data 124 and the ordered control parameters sets 122.

In some embodiments, the search system 130 may be configured to generate the candidate control parameter sets 136 and provide the candidate control parameter sets 136 to the simulation system 120. The candidate control parameter sets 136 may be the control parameter sets that may be ordered by the simulation system 120 before performing the simulations. In these and other embodiments, the search system 130 may also provide a set of order variables for each candidate control parameter set 136. A set of order variables for a candidate control parameter set may include an order variable for each vector control parameter in the candidate control parameter set.

In these and other embodiments, the search system 130 may generate the candidate control parameter sets 136 based on the control parameter sets 134 and the performance data 124 received from the search system 130. In these and other embodiments, the control parameter sets 134 may have been previously provided to the simulation system 120 and may have been used to generate the performance data 124.

For example, the search system 130 may generate a first candidate control parameter set and provide the first candidate control parameter set to the simulation system 130. The simulation system 130 may generate performance data 124 for the first candidate control parameter set and provide the performance data 124 to the search system 130. After obtaining the performance data 124, the first candidate control parameter set may become a first control parameter set. The first control parameter set may be used by the search system 130 with the performance data 124 to determine a second candidate control parameter set to provide to the simulation system 130.

Note that the control parameter sets 134 generated by the search system 130 may not be ordered. As such, the values of the vector control parameters of the control parameter sets 134 in the search system 130 may not be ordered and the values of the vector control parameters of the candidate control parameter sets 136 in the search system 130 may not be ordered.

In some embodiments, the search system 130 may employ a search algorithm 132 to generate the candidate control parameter sets 136 using the control parameter sets 134 and the performance data 124. In these and other embodiments, the search system 130 may employ the search algorithm 132 to generate the order variables associated with the candidate control parameter sets 136 using the control parameter sets 134 and the performance data 124. For example, the search algorithm 132 may select values from the control parameter sets 134 to use in the candidate control parameter sets 136. In these and other embodiments, the search algorithm 132 may select values from one or more control parameter sets 134 based on the performance data 124 of the one or more control parameter sets 134 being above a threshold. Alternately or additionally, the search algorithm 132 may select values from one or more control parameter sets 134 that when ranked according to the performance data 124 include a ranking above a threshold. The thresholds may be based on a desired outcome for the control system. As such, the search algorithm may select values for the control parameter sets 134 that result in the control system 110 generating desired behaviors.

In some embodiments, the search algorithm 132 may be an evolutionary adaptive heuristic search algorithm. For example, the search algorithm 132 may be a genetic search algorithm or some other type of evolutionary adaptive heuristic search algorithm. In these and other embodiments, the search algorithm 132 may select two or more of the control parameter sets 134. In these and other embodiments, the search algorithm 132 may select two or more of the control parameter sets 134 based on their corresponding performance data 124. The search algorithm 132 may use the values of the parameters of the selected control parameter sets 134 to construct one of the candidate control parameter sets 136 in a recombination process. For example, the control parameter sets 134 may include five control parameters P1, P2, P3, P4, and P5. In these and other embodiments, the search algorithm 132 may use values of P1 and P4 from a first one of the control parameter sets 134 and use values of P2, P3, and P5 from a second one of the control parameter sets 134 for a candidate control parameter set 136.

In some embodiments, the search algorithm 132 may combine values from different vector control parameters to form a new vector control parameter. For example, a first vector control parameter of a first one of the control parameter sets 134 may include values V1, V2, and V3. A second vector control parameter of a second one of the control parameter sets 134 may include values V4, V5, and V6. In these and other embodiments, the search algorithm 132 may select values V1, V2, and V5 for the vector control parameter of a candidate control parameter set 136.

In some embodiments, the search algorithm 132 may not use values from any of the control parameter sets 134 for one or more of the control parameters for one or more of the candidate control parameter sets 136. In these and other embodiments, the search algorithm 132 may assign a random value to one or more of the control parameters for the one or more of the candidate control parameter sets 136. For example, the control parameter sets 134 may include five control parameters P1, P2, P3, P4, and P5. In these and other embodiments, the search algorithm 132 may use values of P1 and P4 from a first one of the control parameter sets 134, use values of P2 and P5 from a second one of the control parameter sets 134, and a random value for P3 for a candidate control parameter set 136. In these and other embodiments, the search algorithm 132 may provide random values for each of the candidate control parameter sets 136 or a subset of the candidate control parameter sets 136.

In some embodiments, an iterative process may occur in the environment 100 to select a control parameter set that may be used for the control system 110. For example, the search system 130 may obtain an initial candidate control parameter sets 136 and provide the initial candidate control parameter sets 136 to the simulation system 120. In these and other embodiments, the initial candidate control parameter sets 136 may be obtained from a previous iteration of the environment 100. Alternately or additionally, some or all of the values for the initial candidate control parameter sets 136 may be randomly selected. Alternately or additionally, some or all of the values for the initial candidate control parameter sets 136 may be selected by a user of the environment 100. The search system 130 may also set the control parameter sets 134 based on the candidate control parameter sets 136. For example, the values of the control parameter sets 134 may be set to be equal to the candidate control parameter sets 136.

In these and other embodiments, the simulation system 120 may order the vector control parameters of the candidate control parameter sets 136 according to the order variables to generate the ordered control parameter sets 122. The simulation system 120 may simulate operation of the control system 110 using each of the ordered control parameters sets 122 and record the performance data 124 for each simulation. The simulation system 120 may provide the performance data 124 to the search system 130. The search system 130 may use the performance data 124 and the control parameter sets 134 to select two or more of the control parameter sets 134 for the recombination process. In these and other embodiments, a number of candidate control parameter sets 136 may be generated that may equal the number of control parameter sets 134. The candidate control parameter sets 136 may be generated using one or more different recombination processes among some or all of the control parameter sets 134. A further description of the iterative process is provided with respect to FIG. 2.

In some embodiments, the search algorithm 132 may also be configured to model how changes in the control parameters of the control parameter sets 134 result in changes to the performance data 124. In these and other embodiments, to model the changes, the search algorithm 132 may compare the changes between the control parameter sets 134 and the candidate control parameter sets 136 to changes in performance data 124 to assist in determining which of the control parameters may result in adjustments in the performance data. In these and other embodiments, based on the control parameters that may result in adjustments in the performance data, the search algorithm 132 may adjust the recombination process. For example, the search algorithm 132 may select different control parameters to be shared or not shared in the recombination process based on the control parameters that may result in adjustments in the performance data.

Modifications, additions, or omissions may be made to FIG. 1 without departing from the scope of the present disclosure. For example, in some embodiments, the environment 100 may include multiple simulation systems 120. In these and other embodiments, the search system 130 may provide different subsets of the candidate control parameter sets 136 to each of the simulation systems 120. In these and other embodiments, each of the simulation systems 120 may be associated with a different control system 110, but the logic and responses for each of the different control systems 110 may be the same for the same control parameters 112.

Figure 2:
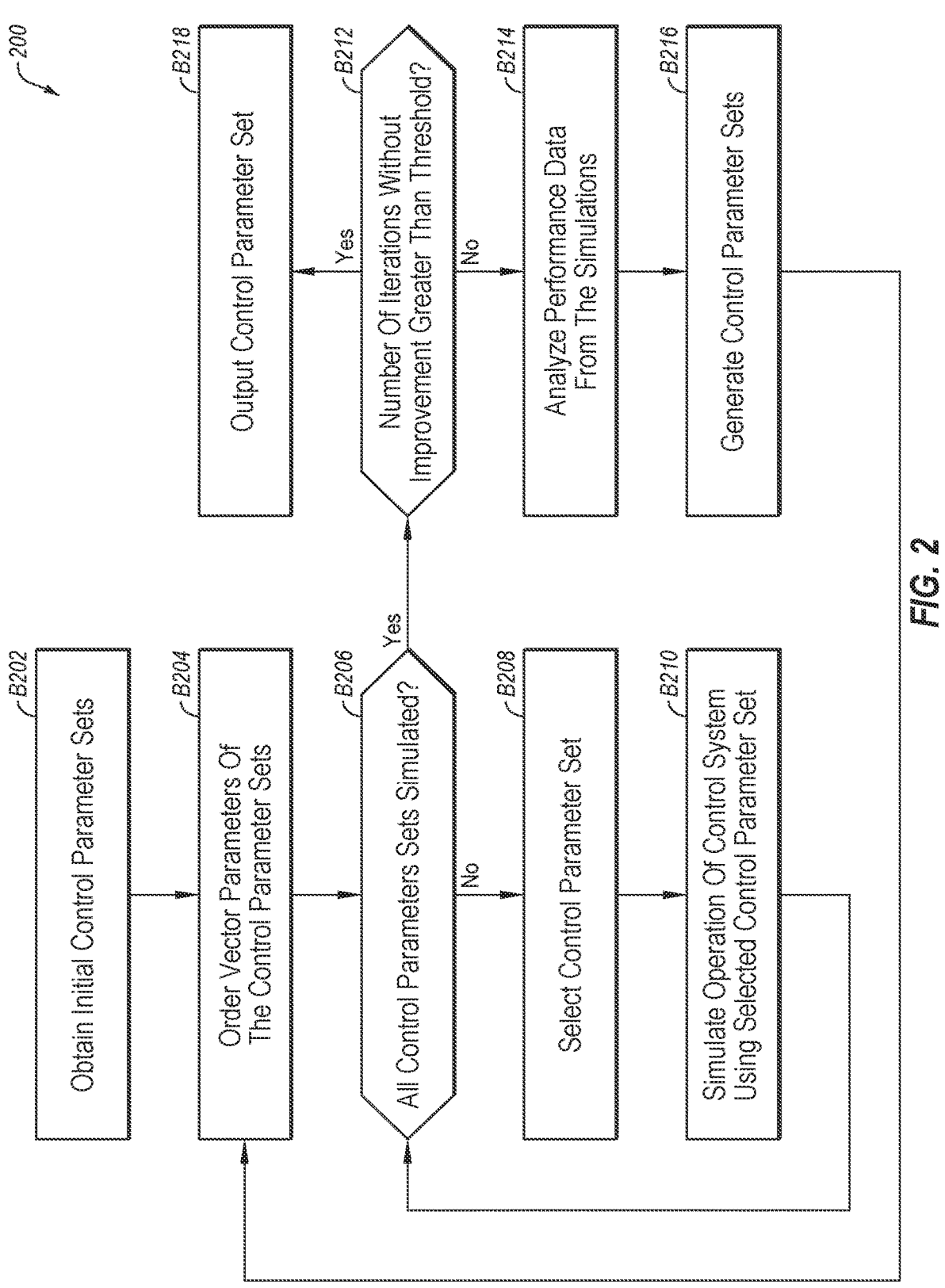
FIG. 2 is a flow diagram showing a method of automated tuning of control parameters, in accordance with some embodiments of the present disclosure.

Now referring to FIG. 2, each block of method 200, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 200 may be performed by elements such as those described with respect to the environment 100 of FIG. 1. However, these methods may additionally or alternatively be executed by any one system, or any combination of systems, including, but not limited to, those described herein.

FIG. 2 is a flow diagram showing a method 200 of automated tuning of control parameters, in accordance with some embodiments of the present disclosure. The method 200 may be carried out via one or more systems such as a simulation system and a search system, such as but not limited to the simulation system 120 and search system 130 of FIG. 1.

For the method 200, at block B202, initial control parameter sets may be obtained. Each of the initial control parameter sets may include control parameters that may be associated with a control system. In some embodiments, the control system may be analogous to the control system 110 described with respect to FIG. 1.

In some embodiments, one or more of the control parameters may be vector control parameters. In these and other embodiments, the control parameters may associate with an order variables for each of the vector control parameters. An order variable may indicate whether its corresponding vector control parameter is to be ordered to be monotonically increasing or decreasing.

In some embodiments, the values for the control parameters for each of the initial control parameter sets may be randomly selected. Alternately or additionally, the values for the control parameters for each of the initial control parameter sets may be randomly selected from a range of values that may be appropriate for the control parameters given the parameters of the control system. Alternately or additionally, the values for the vector control parameters may be selected such that the values for the vector control parameters are unordered. The value for the order variables may also be randomly selected to cause corresponding vector control parameters to be either increasing or decreasing in order.

In some embodiments, a number of the initial control parameter sets may be selected by a user. In these and other embodiments, the number may be based on a number of the control parameters in a control parameter set, operating capabilities of a system performing the method 200, and a time allotted to perform the method 200, among others.

At block B204, vector control parameters of the control parameter sets may be ordered. The vector control parameters may be ordered according to the values of the corresponding order variables.

At block B206, it may be determined whether all of the control parameters sets have been simulated. For example, it may be determined whether the control system has been simulated with each of the control parameter sets. As an example, for three control parameters sets, it may be determined whether one or more simulations have been performed for one or more operations of the control system when the control system uses each of the three control parameters sets. As such, at least three simulations would be performed of the control system, a first simulation with the first control parameter set, a second simulation with the second control parameter set, and a third simulation with the third control parameter set. In response to all of the control parameters sets having been simulated, the method 200 may proceed to block B212. In response to all of the control parameters sets not being simulated, the method 200 may proceed to block B208.

At block B208, a control parameter set may be selected. A control parameter set may be selected based on one or more simulations of the control system with the control parameter set not having been performed.

At block B210, operation of a control system may be simulated using the selected control parameter set. In these and other embodiments, values of the control parameters of the control system may be set to be equal to the values of the control parameters of the selected control parameter set. A simulation system, such as the simulation system 120 of FIG. 1, may perform a simulation of operation of the control system with the selected control parameter set and performance data for the selected control parameter set may be recorded.

In some embodiments, the method 200 may track the best performance data achieved amongst iterations of the method 200. In these and other embodiments, a control parameter set with the best performance data across all iterations of the method 200 may be noted and stored as the global best control parameter set. In these and other embodiments, after performing the simulation for all of the current control parameter sets and updating the global best control parameter set if applicable, it may be determined how many iterations of the method 200 have passed since the global best control parameter set was updated.

At block B212, it may be determined if a number of the iterations without improvement, i.e. a change in the global best control parameter set, is greater than a threshold. In short it may be determined how many iterations of the method 200 have occurred without an iteration generating a control parameter set with better performance data than the global best control parameter set. In response to the number of iterations without improvement being greater than the threshold, the method 200 may proceed to block B218. In response to the number of iterations without improvement being less than or equal to the threshold, the method 200 may proceed to block B214.

In some embodiments, a value of the threshold may be based on a number of the control parameters in a control parameter set, operating capabilities of a system performing the method 200, and/or a time allotted to perform the method 200, among other factors.

At block B214, performance data from the simulations may be analyzed. In some embodiments, the performance data for each of the control parameters sets from the simulations may be analyzed. For example, the performance data may be analyzed to sort the control parameters sets based on the performance data. Alternately or additionally, the performance data may be analyzed to model how changes in the control parameters of the control parameter sets results in changes to the performance data.

At block B216, candidate control parameter sets may be generated. The candidate control parameters sets may be generated using on an evolutionary adaptive heuristic search algorithm. In these and other embodiments, generating the candidate control parameters sets may be performed by a recombination process using the previous control parameter sets for which simulation has been performed. In these and other embodiments, the recombination process may be based on the analysis performed in the block B214. For example, the recombination process may be based on the model illustrating how changes in the control parameters of the control parameter sets result in changes to the performance data and the sorting of the control parameters sets. After generating the candidate control parameters sets, the method 200 may proceed to block B204 to have the vector parameters of the candidate control parameters sets ordered and another iteration of the method 200 may be performed.

At block B218, a control parameter set may be output. In these and other embodiments, the control parameter set output may be the global best control parameter set with the best performance data recorded during a simulation of the control system. The control parameter set output may be used by the control system during operation of the control system to control the behavior of a system/device. For example, the values of the control parameter set output may be used in the control system implemented in a system/device.

Modifications, additions, or omissions may be made to the method 200 without departing from the scope of the present disclosure. For example, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 200 may include additional blocks or fewer blocks. For example, in some embodiments, multiple simulations for each of the control parameters sets may be performed in block B210.

FIG. 4 is a flow diagram showing a method 400 to automate tuning of control parameters, in accordance with some embodiments of the present disclosure. The method 400 may be carried out via a simulation system, such as but not limited to the simulation system 120 of FIG. 1.

For the method 400, at block B402, one or more parameter sets may be obtained from a search algorithm. In some embodiments, the one or more parameter sets may determine how a controller responds to an environment with at least one changing variable. In these and other embodiments, each of the one or more parameter sets may include a vector parameter that includes a vector of values and a value selected from the vector of values for the vector parameter during operation of the controller may be based on the at least one changing variable.

In some embodiments, the search algorithm may determine the values of the vector of values and the values in the vector of values determined by the search algorithm may be unordered. In some embodiments, the search algorithm may be an evolutionary adaptive heuristic search algorithm.

At block B404, the vector of values for the vector parameter of the one or more parameter sets may be ordered. In some embodiments, the one or more parameter sets may be associated with an order variable for the vector parameter. In these and other embodiments, the order variable may determine whether the vector of values is ordered to be monotonically increasing or monotonically decreasing. In some embodiments, the order variable may be determined by the search algorithm.

At block B406, operation of the controller may be simulated using the one or more parameter sets with the ordered vector of values for the vector parameter.

Modifications, additions, or omissions may be made to the method 400 without departing from the scope of the present disclosure. For example, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

For example, in some embodiments, the method 400 may further include obtaining an indication of controller functionality for each of the one or more parameter sets based on the simulation of operation of the controller. The method 400 may further include determining, using the search algorithm, one or more second parameter sets based on the one or more parameter sets and the indications of controller functionality. The method 400 may further include ordering second vector of values for second vector parameters of the one or more second parameter sets. In some embodiments, the vector of values of the one or more parameter sets used by the search algorithm to determine the one or more second parameter sets may be unordered.

Example Autonomous Vehicle

Figure 5A:
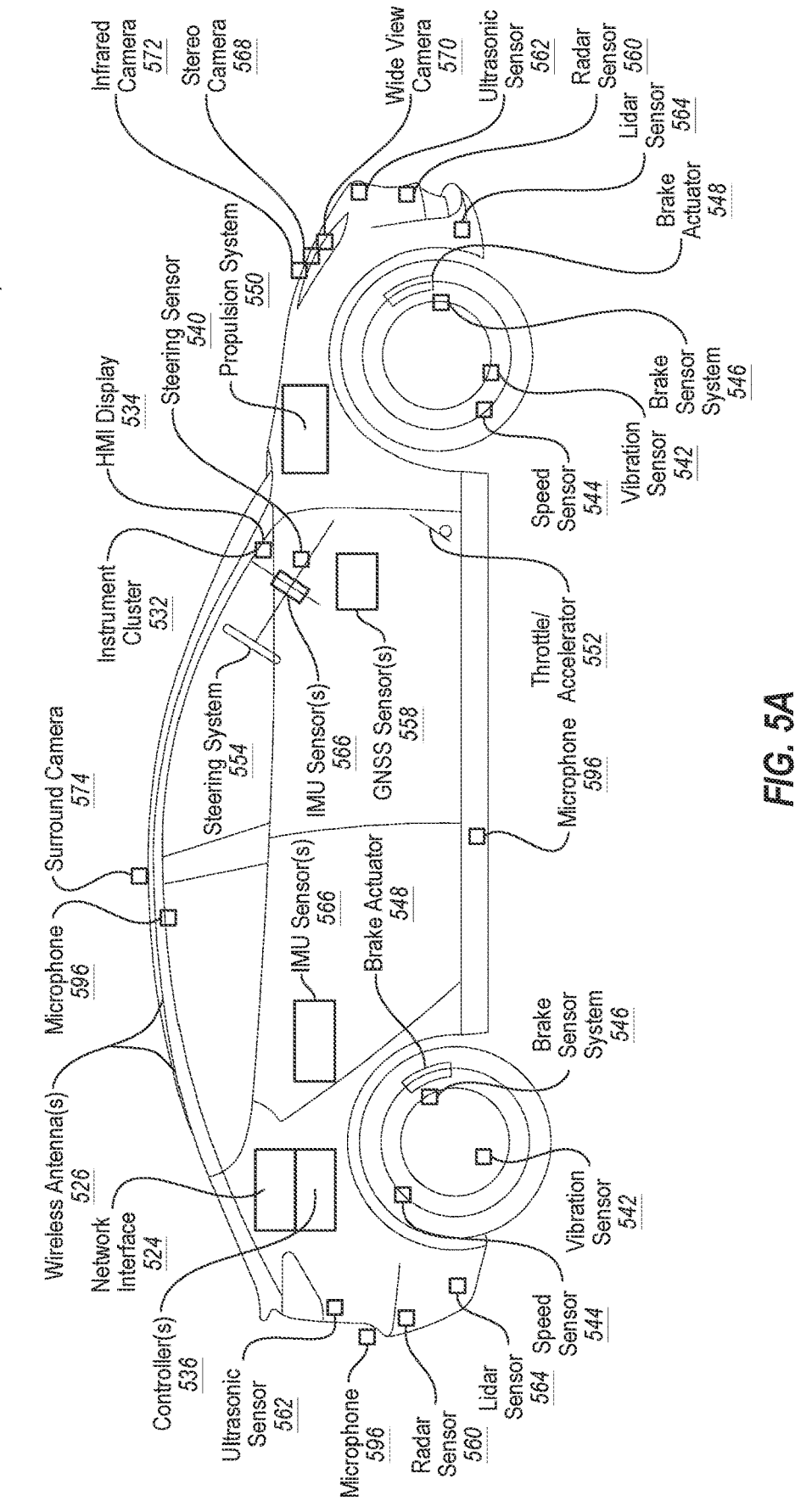
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU(s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
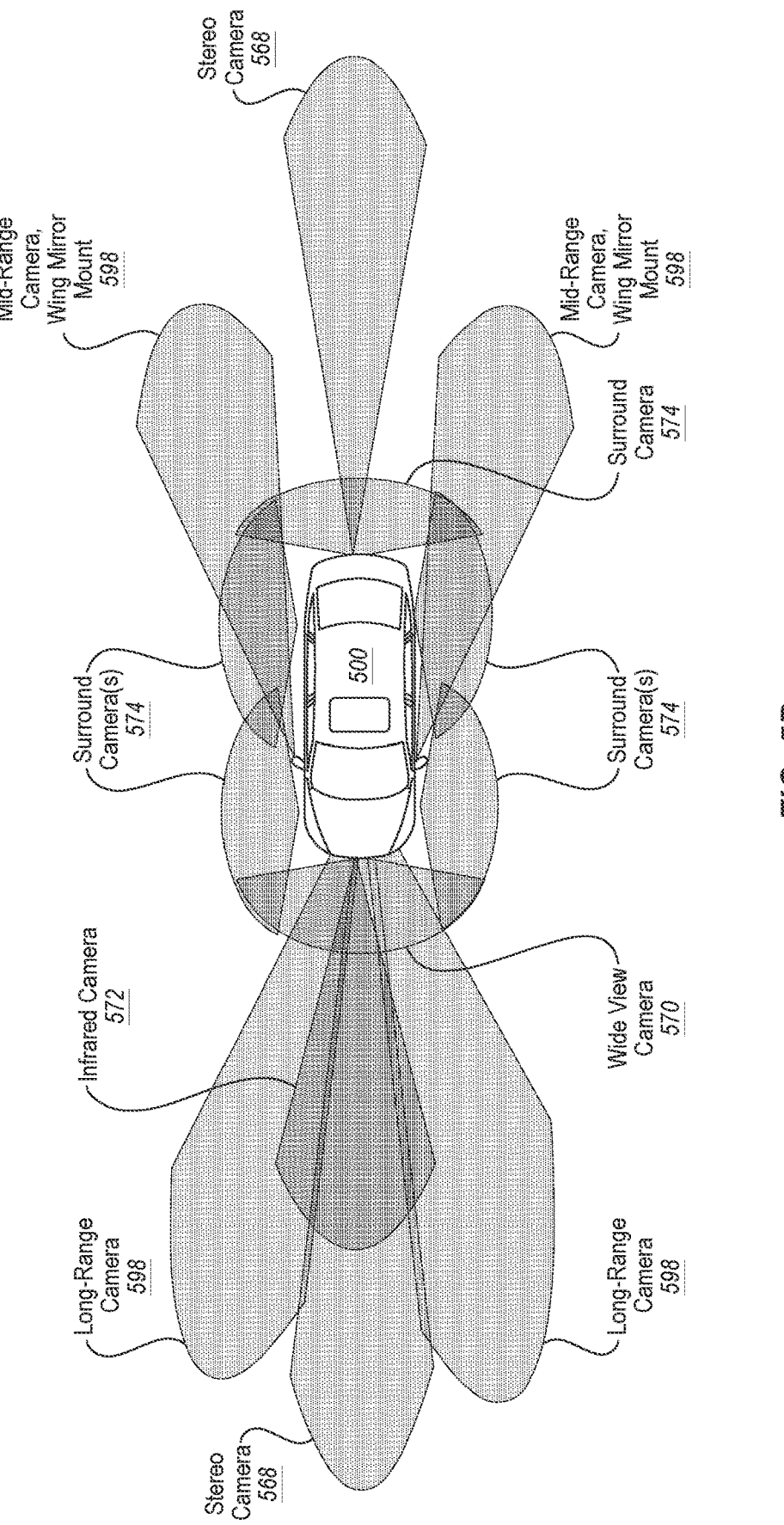
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RB GC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that includes portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned around the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
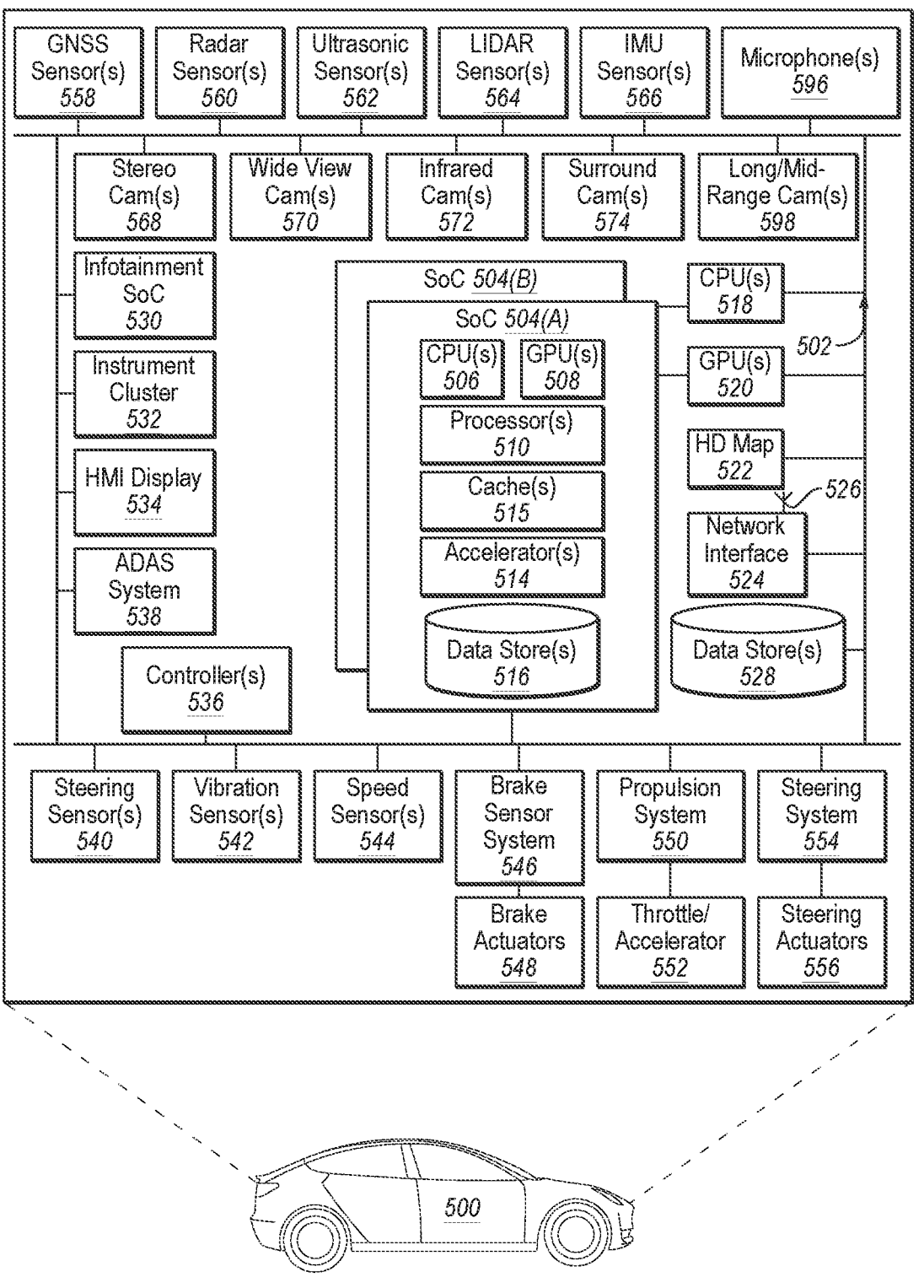
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use computer-based application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and actively performing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, which use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include an SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558 (e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 500 at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 100 m, with an accuracy of 2 cm-3 cm, and with support for a 100 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include an SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjusts the vehicle speed to maintain a safe distance from vehicles ahead. Lateral ACC performs distance keeping, and advises the vehicle 500 to change lanes when necessary. Lateral ACC is related to other ADAS applications such as LC and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 500), while the I2V communication concept provides information about traffic farther ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include multiple GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced roadwork. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
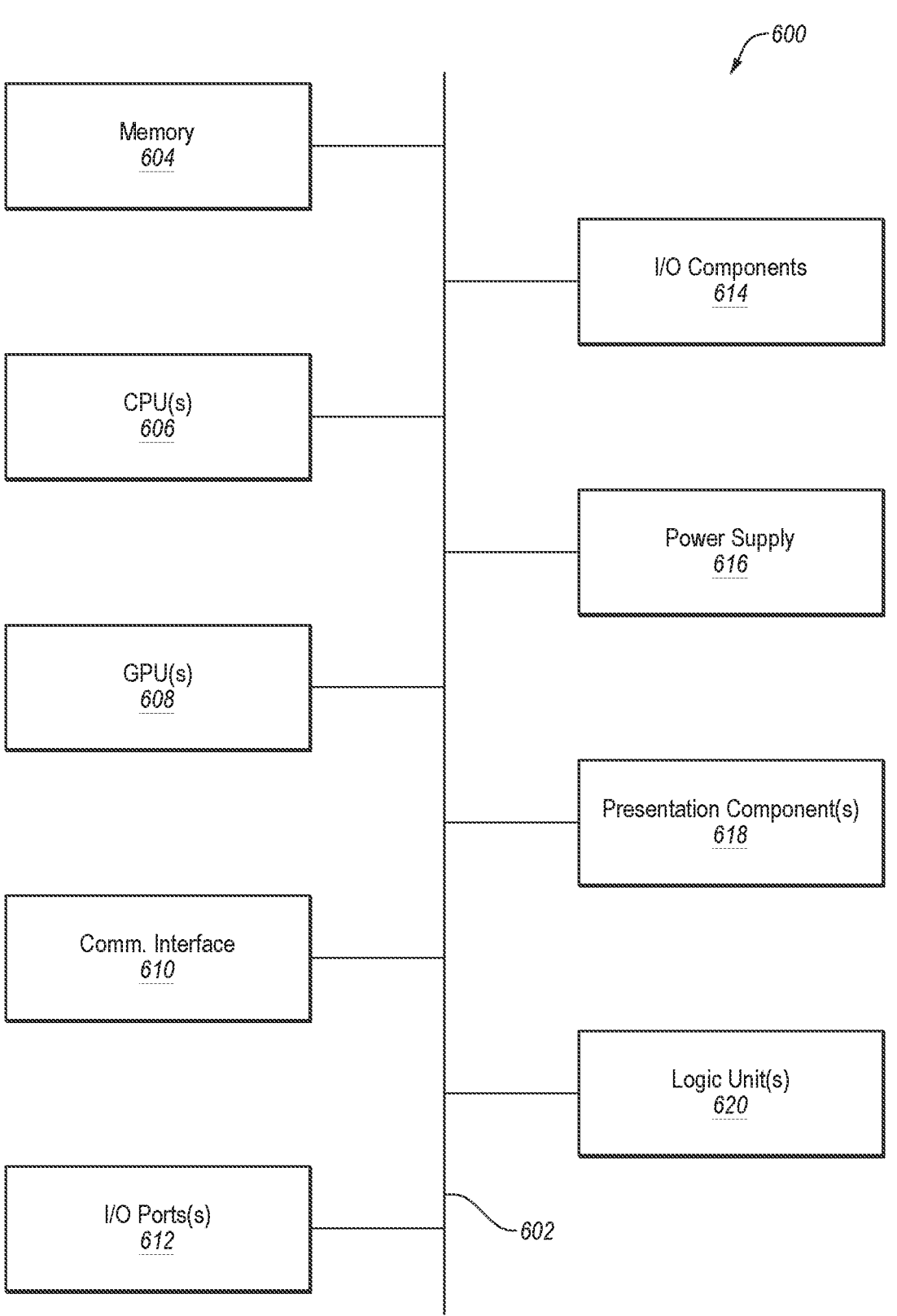
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, I/O ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, including wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built into (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
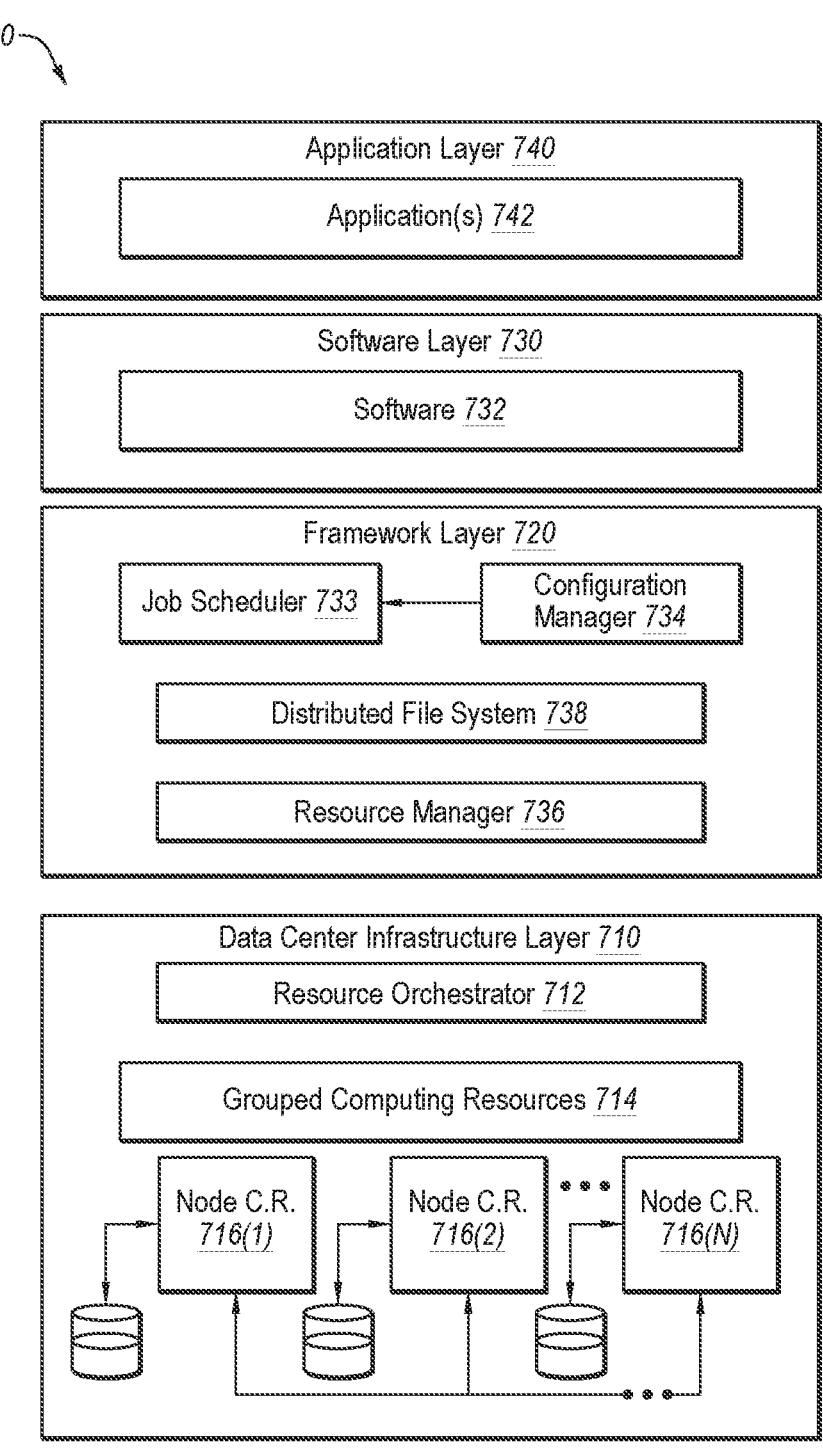
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-916(N), where "N" represents any whole, positive integer. In at least one embodiment, node C.R.s 716(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-916(N) may correspond to a server having one or more of the above-mentioned computing resources. In addition, in some embodiments, the node C.R.s 716(1)-9161(N) may include one or more virtual components, such as vGPUs, vCPUs, and/or the like, and/or one or more of the node C.R.s 716(1)-916(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-916(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager

736 may coordinate with resource orchestrator 712 to manage these mapped or allocated computing resources.

In at least one embodiment, software 732 included in software layer 730 may include software used by at least portions of node C.R.s 716(1)-916(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-916(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:

one or more processing units to perform operations, the operations comprising:

obtaining one or more first parameter sets that determine how a controller responds to an environment with at least one changing variable, at least one parameter set of the one or more first parameter sets including a first vector parameter that includes a first vector of values, wherein at least one value of the first vector parameter is selected from the first vector of values based at least on the at least one changing variable during operation of the controller;

obtaining an indication of controller functionality for at least one of the one or more first parameter sets;

determining one or more second parameter sets based at least on the one or more first parameter sets and the indications of controller functionality;

simulating at least one operation of the controller using the one or more second parameter sets, a second vector of values for a second vector parameter of the one or more second parameter sets being ordered to be monotonically increasing or monotonically decreasing before simulation of the operation of the controller in the environment using the one or more second parameter sets; and adjusting the controller based at least on a particular second parameter set selected from the one or more second parameter sets, the particular second parameter set being selected based at least on the simulating of the at least one operation of the controller.

2. The one or more processors of claim 1, wherein the determining the one or more second parameter sets comprises using a search algorithm to determine one or more values of the second vector of values and the values in the vector of values determined by the search algorithm are unordered.

3. The one or more processors of claim 1, wherein the one or more second parameter sets are associated with an order variable for the second vector parameter, the order variable indicating whether the second vector of values is monotonically increasing or monotonically decreasing.

4. The one or more processors of claim 3, wherein the order variable is determined by a search algorithm.

5. The one or more processors of claim 4, wherein the search algorithm is an evolutionary adaptive heuristic search algorithm.

6. The one or more processors of claim 1, wherein the one or more first parameter sets includes a plurality of first parameter sets and a search algorithm determines one or more values for the second vector of values using the values of the first vector of values from two or more of the plurality of first parameter sets, the second vector of values determined by the search algorithm being unordered.

7. The one or more processors of claim 1, wherein the one or more processors is are part of one or more of:

a control system for an autonomous or semi-autonomous machine;

a perception system for an autonomous or semi-autonomous machine;

a system for performing simulation operations;

a system for performing deep learning operations;

a system for generating synthetic data;

a system for generating multi-dimensional assets using a collaborative content platform;

a system implemented using an edge device;

a system implemented using a robot;

a system incorporating one or more virtual machines (VMs);

a system implemented at least partially in a data center; or a system implemented at least partially using cloud computing resources.

8. A method of automated tuning of control parameters, the method comprising:

obtaining, using a search algorithm, one or more parameter sets that determine how a controller responds to an environment with at least one changing variable, at least one of the one or more parameter sets including a vector parameter that includes a vector of values, wherein at least one value is selected from the vector of values for the vector parameter during operation of the controller based at least on the at least one changing variable;

ordering the vector of values for the vector parameter of the one or more parameter sets to be monotonically increasing or monotonically decreasing;

simulating at least one operation of the controller using the one or more parameter sets with the ordered vector of values for the vector parameter; and tuning the controller based at least on a particular parameter set selected from the one or more parameter sets, the particular parameter set being selected based at least on the simulating of the at least one operation of the controller.

9. The method of claim 8, wherein the search algorithm determines the values of the vector of values as an unordered set of values.

10. The method of claim 8, wherein the one or more parameter sets is associated with an order variable, the order variable determining whether the vector of values is ordered to be monotonically increasing or monotonically decreasing.

11. The method of claim 10, wherein the order variable is determined by the search algorithm.

12. The method of claim 8, further comprising:

obtaining an indication of controller functionality for at least one of the one or more parameter sets based at least on the simulating the at least one operation of the controller;

determining, using the search algorithm, one or more second parameter sets based at least on the one or more parameter sets and the indications of controller functionality; and ordering second vector of values for second vector parameters of the one or more second parameter sets.

13. The method of claim 12, wherein the vector of values of the one or more parameter sets used by the search algorithm to determine the one or more second parameter sets includes an unordered vector of values.

14. A method of automated tuning of control parameters, the method comprising:

obtaining, using a search algorithm, one or more parameter sets that determine how a controller responds to an environment with at least one changing variable, at least one of the one or more parameter sets including a vector parameter that includes a vector of values and being associated with an order variable that dictates whether the vector of values is to be monotonically increasing or monotonically decreasing, a value selected from the vector of values for the vector parameter based at least on the at least one changing variable;

monotonically ordering the vector of values for the vector parameter of the one or more parameter sets using the order variable;

simulating at least one operation of the controller using the one or more parameter sets with the ordered vector of values for the vector parameter; and adjusting one or more parameters of the controller according to a particular parameter set selected from the one or more parameter sets, the particular parameter set being selected based at least on one or more results of the simulating of the at least one operation of the controller.

15. The method of claim 14, wherein at least one value of the vector of values determined by the search algorithm are unordered.

16. The method of claim 14, wherein the search algorithm is an evolutionary adaptive heuristic search algorithm.

17. The method of claim 14, further comprising:

obtaining an indication of controller functionality for at least one of the one or more parameter sets based at least on the simulating the at least one operation of the controller;

determining, using the search algorithm, one or more second parameter sets based at least on the one or more parameter sets and the indications of controller functionality; and ordering a second vector of values for second vector parameters of the one or more second parameter sets.

18. The method of claim 17, wherein the vector of values of the one or more parameter sets used by the search algorithm to determine the one or more second parameter sets are unordered.

* * * * *